US012627049B2

(12) United States Patent
Yong et al.

(10) Patent No.: US 12,627,049 B2
(45) Date of Patent: May 12, 2026

(54) ELECTRONIC DEVICES HAVING CO-LOCATED MILLIMETER WAVE ANTENNAS

(71) Applicant: Apple Inc., Cupertino, CA (US)

(72) Inventors: Siwen Yong, Mountain View, CA (US); Jiangfeng Wu, San Jose, CA (US); Yi Jiang, Cupertino, CA (US); Simon G. Begashaw, Santa Clara, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1248 days.

(21) Appl. No.: 17/031,627

(22) Filed: Sep. 24, 2020

(65) Prior Publication Data

US 2022/0094061 A1 Mar. 24, 2022

(51) Int. Cl.

*H01Q 5/42* (2015.01)
*H01Q 1/24* (2006.01)
*H01Q 5/385* (2015.01)
*H01Q 9/04* (2006.01)

(52) U.S. Cl.

CPC ............ *H01Q 5/385* (2015.01); *H01Q 1/243* (2013.01); *H01Q 9/0414* (2013.01)

(58) Field of Classification Search

CPC ...... H01Q 5/385; H01Q 1/243; H01Q 9/0414; H01Q 5/42

See application file for complete search history.

(56) References Cited

U.S. PATENT DOCUMENTS 4,316,194 A * 2/1982 De Santis .............. H01Q 21/12 343/846
5,497,164 A * 3/1996 Croq .................... H01Q 19/005 343/846
5,777,581 A * 7/1998 Lilly .................... H01Q 19/005 343/745

(Continued)

FOREIGN PATENT DOCUMENTS

WO WO-2021083027 A1 * 5/2021 ............... H01Q 1/22

OTHER PUBLICATIONS

U.S. Appl. No. 17/028,864, filed Sep. 22, 2020.

*Primary Examiner* — David E Lotter
*Assistant Examiner* — Bamidele A Immanuel
(74) *Attorney, Agent, or Firm* — Treyz Law Group, P.C.; Michael H. Lyons; Tianyi He

(57) ABSTRACT

An electronic device may include a phased antenna array. The array may include co-located first and second antennas formed on a dielectric substrate. The first antenna may include a first patch element and multi-layer parasitic structures. The multi-layer parasitic structures may include a first set of co-planar parasitic elements. The first set of parasitic elements may overlap the first patch element and may be separated by a gap. The multi-layer parasitic structures may include an additional parasitic element that overlaps the gap. The second antenna may include a second patch element that is co-planar with the additional parasitic patch. The second patch element may at least partially overlap one of the parasitic elements in the first set. The first and second patch antennas may collectively cover first and second frequency bands while occupying a minimal amount of space on the dielectric substrate.

20 Claims, 8 Drawing Sheets

(56) References Cited

U.S. PATENT DOCUMENTS

| | | | | |
|---|---|---|---|---|
| 5,943,016 | A * | 8/1999 | Snyder, Jr. | H01Q 19/005 343/700 MS |
| 5,955,994 | A * | 9/1999 | Staker | H01Q 19/005 343/700 MS |
| 6,057,802 | A * | 5/2000 | Nealy | H01Q 21/245 343/873 |
| 6,061,025 | A * | 5/2000 | Jackson | H01Q 9/0421 343/745 |
| 6,091,365 | A * | 7/2000 | Derneryd | H01Q 5/42 343/700 MS |
| 6,133,882 | A * | 10/2000 | LaFleur | H01Q 5/385 343/846 |
| 6,144,344 | A * | 11/2000 | Kim | H01Q 21/10 343/789 |
| 6,211,824 | B1 * | 4/2001 | Holden | H01Q 9/0414 343/846 |
| 6,919,854 | B2 * | 7/2005 | Milroy | H01Q 15/24 343/770 |
| 7,046,196 | B1 * | 5/2006 | Langley | H01Q 9/0457 343/702 |
| 7,852,281 | B2 * | 12/2010 | Choudhury | H01Q 23/00 343/851 |
| 8,354,972 | B2 | 1/2013 | Borja et al. | |
| 8,610,635 | B2 | 12/2013 | Huang et al. | |
| 8,803,749 | B2 | 8/2014 | Leung et al. | |
| 10,224,644 | B1 | 3/2019 | Park et al. | |
| 10,291,698 | B2 | 5/2019 | Hulick et al. | |
| 10,476,170 | B2 | 11/2019 | Rajagopalan et al. | |
| 10,886,630 | B2 * | 1/2021 | Onaka | H01Q 21/24 |
| 2003/0058171 | A1 * | 3/2003 | Umehara | H01Q 1/243 343/702 |
| 2005/0110692 | A1 * | 5/2005 | Andersson | H01Q 19/005 343/702 |
| 2007/0182658 | A1 * | 8/2007 | Ozden | H01Q 1/243 343/866 |
| 2009/0322633 | A1 * | 12/2009 | Yun | H01Q 9/36 343/741 |
| 2010/0164783 | A1 * | 7/2010 | Choudhury | H01Q 1/02 342/175 |
| 2010/0171675 | A1 * | 7/2010 | Borja | H01Q 21/24 343/797 |
| 2010/0219513 | A1 * | 9/2010 | Zhang | H01Q 13/08 257/659 |
| 2011/0090129 | A1 * | 4/2011 | Weily | H01Q 21/064 343/770 |
| 2011/0221652 | A1 * | 9/2011 | Li | H01Q 9/0457 343/860 |
| 2012/0229366 | A1 * | 9/2012 | Ding | H01Q 21/0006 343/907 |
| 2012/0280883 | A1 * | 11/2012 | Ying | H01Q 5/35 343/845 |
| 2012/0287019 | A1 * | 11/2012 | Sudo | H01Q 9/045 343/904 |
| 2013/0169503 | A1 * | 7/2013 | Fakharzadeh Jahromi | H01Q 19/005 343/833 |
| 2013/0307753 | A1 * | 11/2013 | Andrenko | H01Q 1/243 343/904 |
| 2014/0104135 | A1 * | 4/2014 | Delestre | H01Q 21/065 343/893 |
| 2015/0084814 | A1 * | 3/2015 | Rojanski | H01Q 9/0414 342/368 |
| 2015/0194730 | A1 * | 7/2015 | Sudo | H01Q 5/378 343/905 |
| 2016/0285153 | A1 * | 9/2016 | Li | H01Q 5/385 |
| 2017/0256854 | A1 * | 9/2017 | Hu | H01Q 9/40 |
| 2018/0294567 | A1 * | 10/2018 | O'Brien | H01Q 9/0414 |
| 2019/0020110 | A1 * | 1/2019 | Paulotto | H01Q 9/0414 |
| 2019/0020114 | A1 * | 1/2019 | Paulotto | H01Q 1/243 |
| 2019/0020121 | A1 * | 1/2019 | Paulotto | H01Q 21/28 |
| 2019/0027802 | A1 * | 1/2019 | Noori | H01Q 21/065 |
| 2019/0157762 | A1 * | 5/2019 | Shibata | H01Q 9/0407 |
| 2019/0166686 | A1 * | 5/2019 | Jo | H05K 1/0298 |
| 2019/0221935 | A1 * | 7/2019 | Chen | H01Q 21/08 |
| 2019/0221937 | A1 * | 7/2019 | Onaka | H01Q 5/392 |
| 2019/0257933 | A1 | 8/2019 | Nath et al. | |
| 2019/0319364 | A1 * | 10/2019 | Yang | H01Q 5/364 |
| 2019/0319367 | A1 * | 10/2019 | Edwards | H01Q 3/2605 |
| 2019/0334246 | A1 * | 10/2019 | Obata | H01Q 19/02 |
| 2019/0379134 | A1 * | 12/2019 | Paulotto | H01Q 21/062 |
| 2019/0386393 | A1 * | 12/2019 | Chiang | H01Q 5/28 |
| 2019/0393606 | A1 | 12/2019 | Chavali et al. | |
| 2020/0021015 | A1 | 1/2020 | Yun et al. | |
| 2020/0021019 | A1 * | 1/2020 | Rajagopalan | H01Q 1/2291 |
| 2020/0021037 | A1 * | 1/2020 | Wu | H01Q 9/0457 |
| 2020/0091608 | A1 | 3/2020 | Alpman et al. | |
| 2020/0106158 | A1 * | 4/2020 | Gomez Angulo | G06F 1/1698 |
| 2020/0106183 | A1 * | 4/2020 | Fabrega Sanchez | H04B 1/0458 |
| 2020/0106188 | A1 | 4/2020 | Ou et al. | |
| 2020/0106192 | A1 * | 4/2020 | Avser | H01Q 1/405 |
| 2020/0203834 | A1 | 6/2020 | Asaf et al. | |
| 2020/0203848 | A1 * | 6/2020 | Tarng | H01Q 9/30 |
| 2020/0220249 | A1 * | 7/2020 | Asaf | H01Q 25/001 |
| 2020/0274221 | A1 * | 8/2020 | Suzuki | H01Q 21/0075 |
| 2020/0303821 | A1 * | 9/2020 | Lee | H01Q 5/335 |
| 2020/0335869 | A1 * | 10/2020 | Jia | H01Q 9/0457 |
| 2020/0412017 | A1 * | 12/2020 | Park | H01Q 1/526 |
| 2021/0151860 | A1 * | 5/2021 | Park | H01Q 21/24 |
| 2022/0255229 | A1 * | 8/2022 | Jia | H01Q 5/385 |
| 2022/0255238 | A1 * | 8/2022 | Yu | H01Q 21/0025 |
| 2022/0263225 | A1 * | 8/2022 | Jia | H01Q 1/243 |

* cited by examiner

ELECTRONIC DEVICES HAVING CO-LOCATED MILLIMETER WAVE ANTENNAS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high throughputs but may raise significant challenges. For example, if care is not taken, the antennas might occupy an excessive amount of space or may exhibit insufficient bandwidth to cover the entirety of one or more frequency bands of interest.

It would therefore be desirable to be able to provide electronic devices with improved wireless communications circuitry such as communications circuitry that supports millimeter and centimeter wave communications.

SUMMARY

An electronic device may be provided with wireless circuitry. The wireless circuitry may include a phased antenna array. The phased antenna array may convey radio-frequency signals in a signal beam at a frequency greater than 10 GHz.

The phased antenna array may include co-located first and second patch antennas formed on a dielectric substrate. The first patch antenna may include a first directly-fed patch element and multi-layer parasitic structures. The multi-layer parasitic structures may include a first set of co-planar parasitic elements. The first set of parasitic elements may overlap the first directly-fed patch element and may be separated by a gap. The multi-layer parasitic structures may include an additional parasitic element that overlaps the gap. The second patch antenna may include a second directly-fed patch element that is co-planar with the additional parasitic element. The second directly-fed patch element may at least partially overlap one of the parasitic elements in the first set. The first and second patch antennas may collectively cover a first frequency band from 24-30 GHz and a second frequency band from 57-61 GHz while occupying a minimal amount of space on the dielectric substrate.

DETAILED DESCRIPTION

Figure 1:
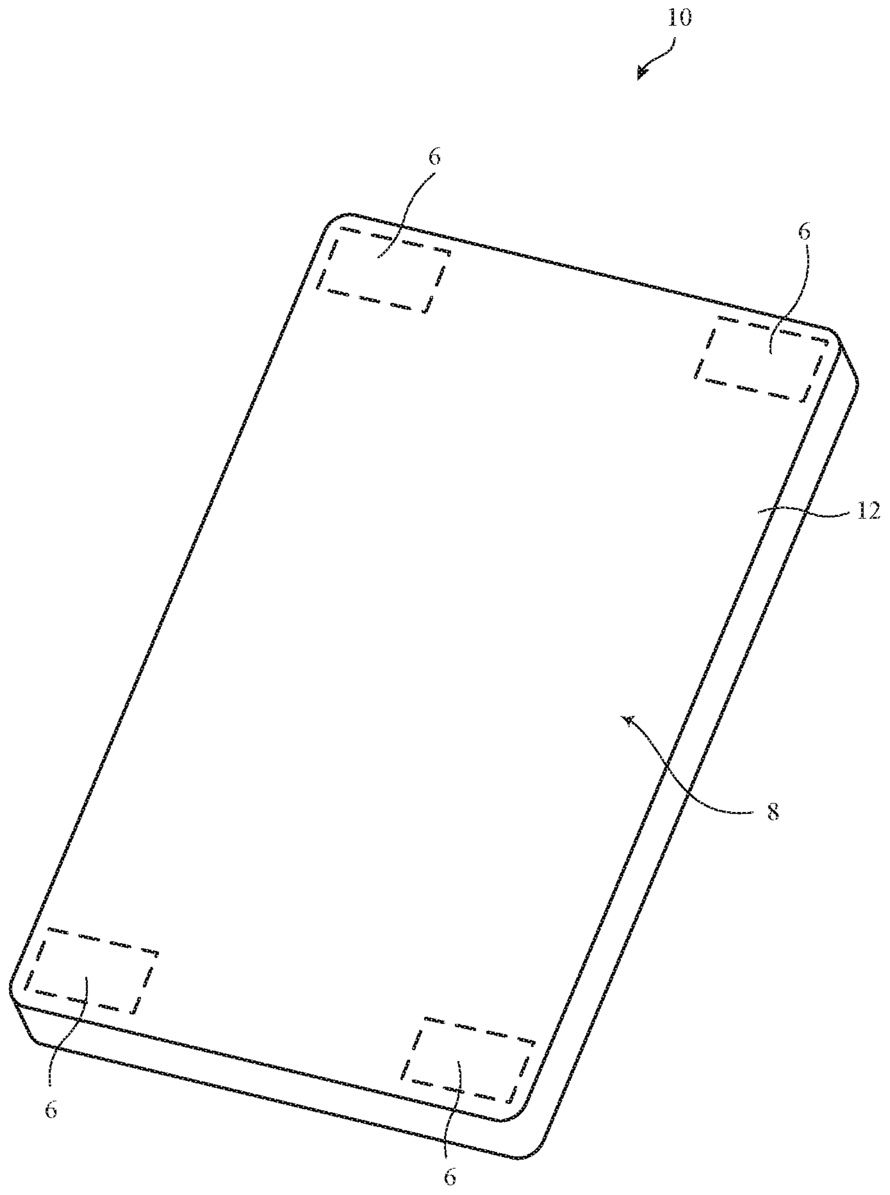
FIG. 1 is a front perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectrics. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display, cover layer that is used in covering and protecting display 8 on the front of device 10, over a dielectric window on a rear face of housing 12 or the edge of housing 12, over a dielectric cover layer such as a dielectric rear housing wall that covers some or all of the rear face of device 10, or elsewhere in device 10.

Figure 2:
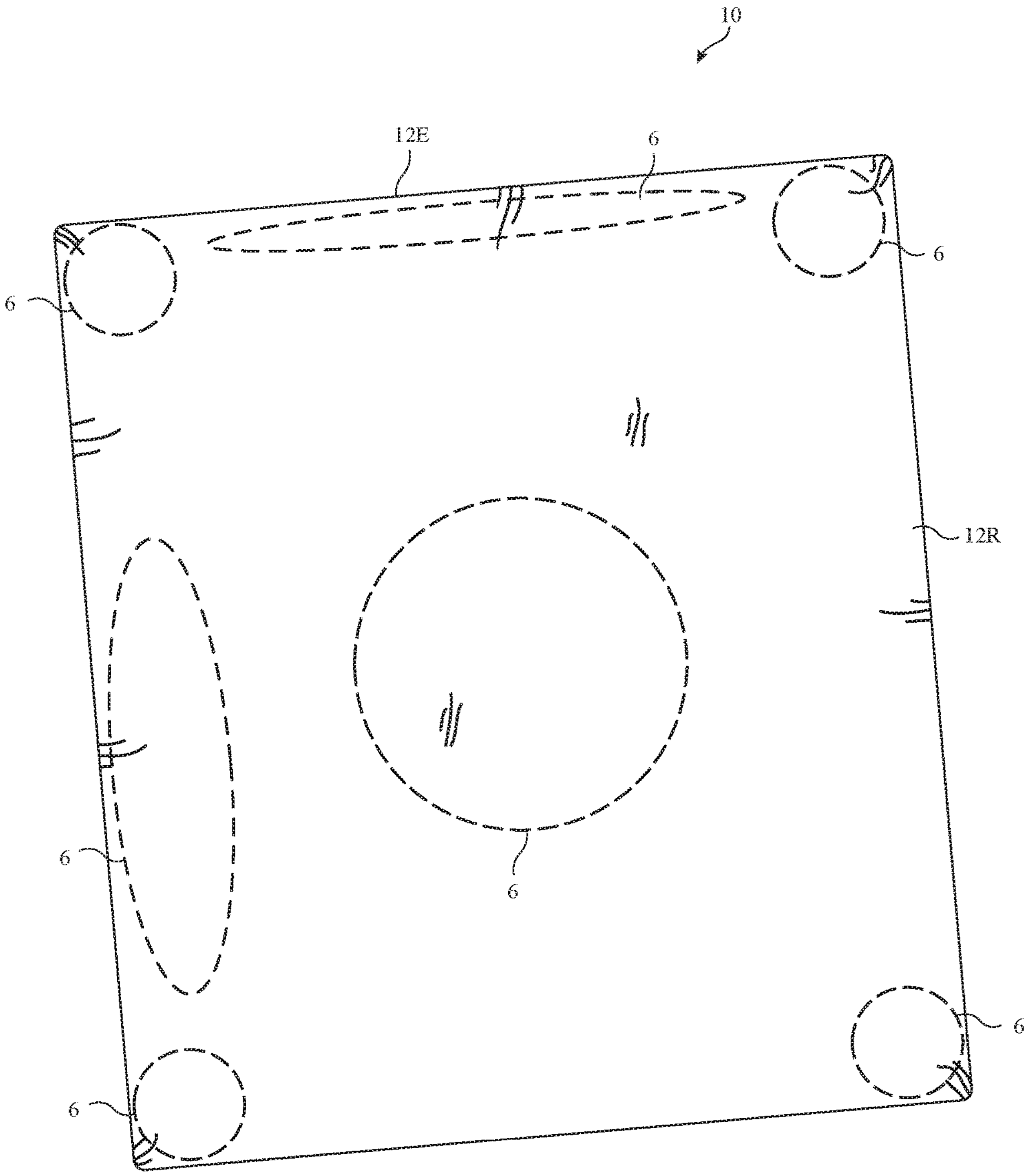
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal regions of the housing such as slots or other openings in the metal may be filled with plastic or other dielectrics. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, etc.). Display S of FIG. 1 may be omitted if desired. Antennas may be located within housing 12, on housing 12, and/or external to housing 12.

Figure 3:
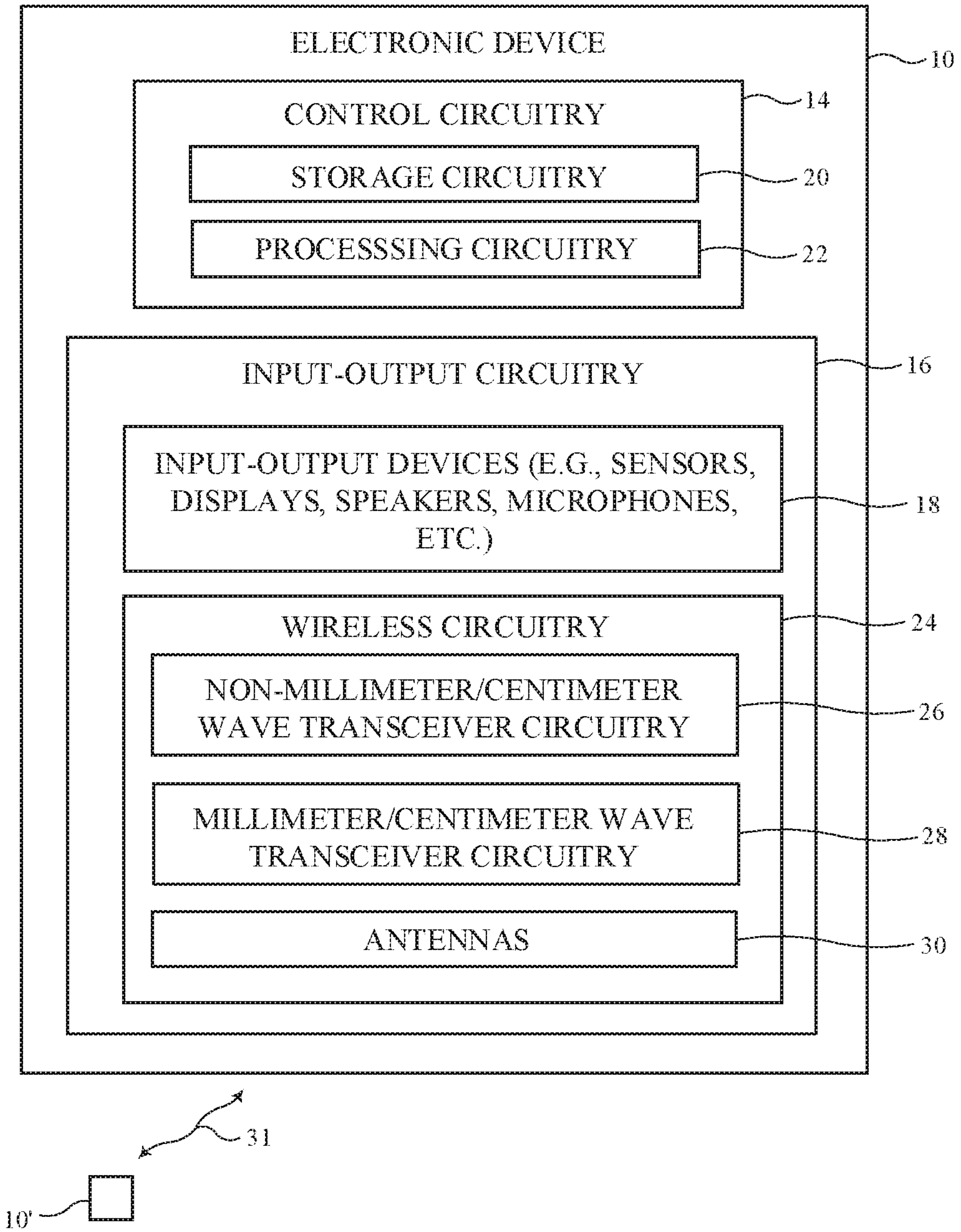
FIG. 3 is a schematic diagram of an illustrative electronic device with wireless circuitry in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internee protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include millimeter and centimeter wave transceiver circuitry such as millimeter/centimeter wave transceiver circuitry 28. Millimeter/centimeter wave transceiver circuitry 28 may support communications at frequencies between about 10 GHz and 300 GHz. For example, millimeter/centimeter wave transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or an other desired frequency band between approximately 10 GHz and 300 GHz. If desired, millimeter/centimeter wave transceiver circuitry 28 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 28 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 28 (sometimes referred to herein simply as transceiver circuitry 28 or millimeter/centimeter wave circuitry 28) may perform spatial ranging operations using radio-frequency signals at millimeter and/or centimeter wave frequencies that are transmitted and received by millimeter/centimeter wave transceiver circuitry 28. The received signals may be a version of the transmitted signals that have been reflected off of external objects and back towards device 10. Control circuitry 14 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 14 may also process the transmitted and received signals to identify a two or three-dimensional spatial location of the external objects relative to device 10.

Spatial ranging operations performed by millimeter/centimeter wave transceiver circuitry 28 are unidirectional. If desired, millimeter/centimeter wave transceiver circuitry 28 may also perform bidirectional communications with external wireless equipment such as external wireless equipment 10' (e.g., over bi-directional millimeter/centimeter wave wireless communications link 31). External wireless equipment 10' may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 28 and the reception of wireless data that has been transmitted by external wireless equipment 10'. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may include transceiver circuitry for handling communications at frequencies below 10 GHz such as non-millimeter/centimeter wave transceiver circuitry 26. For example, non-millimeter/centimeter wave transceiver circuitry 26 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BUS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Non-millimeter/centimeter wave transceiver circuitry 26 and millimeter/centimeter wave transceiver circuitry 28 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 24 may cover (handle) any desired frequency bands of interest. As shown in FIG. 3, wireless circuitry 24 may include antennas 30. The transceiver circuitry may convey radio-frequency signals using one or more antennas 30 (e.g., antennas 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to freespace through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 28 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 26 and another type of antenna may be used in conveying radio-frequency signals at millimeter and/or centimeter wave frequencies for millimeter/centimeter wave transceiver circuitry 28. Antennas 30 that are used to convey radio-frequency signals at millimeter and centimeter wave frequencies may be arranged in one or more phased antenna arrays. In one suitable arrangement that is described herein as an example, the antennas 30 that are arranged in a corresponding phased antenna array may be stacked patch antennas having patch antenna resonating elements that overlap and are vertically stacked with respect to one or more parasitic patch elements.

Figure 4:
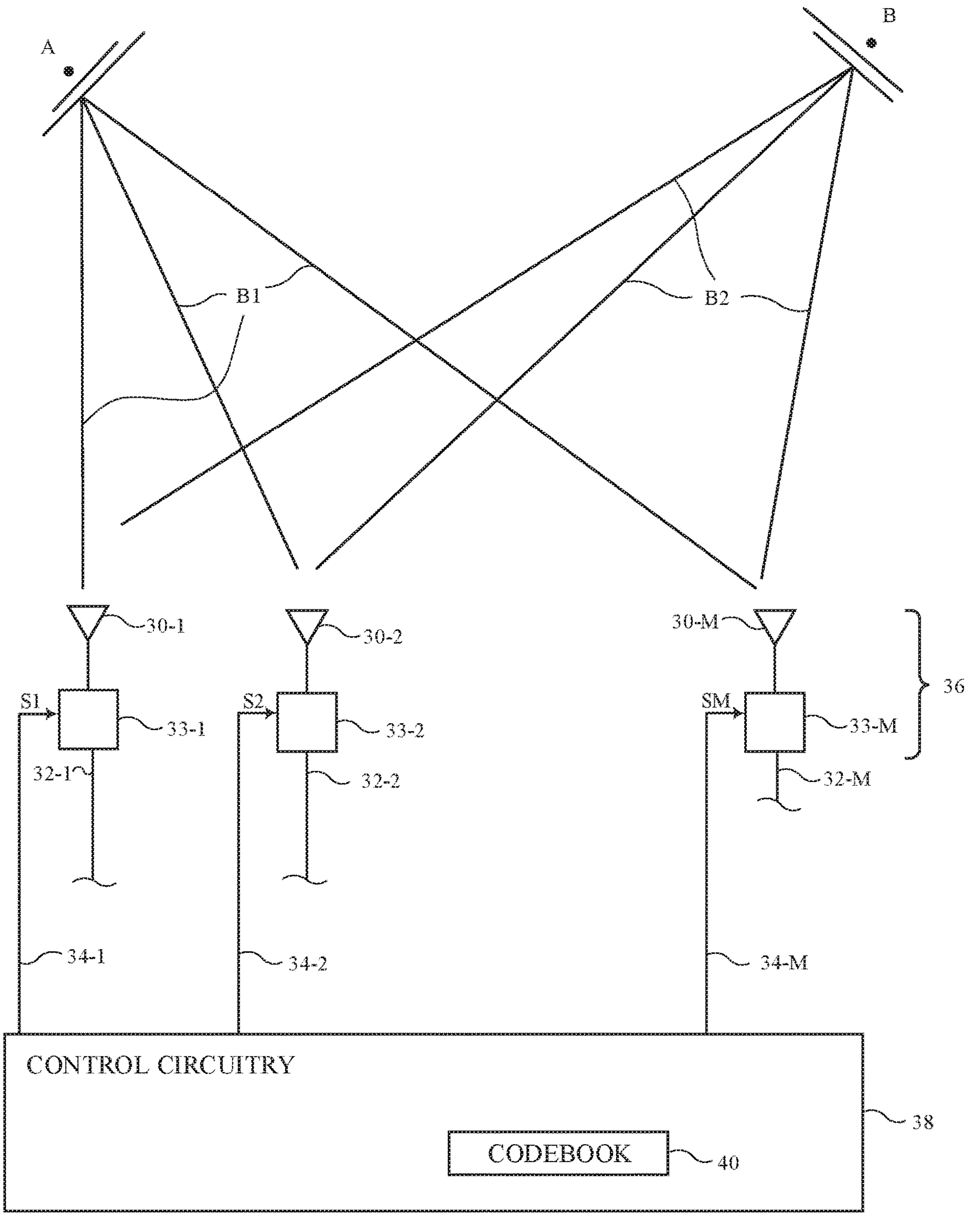
FIG. 4 is a diagram of an illustrative phased antenna array that forms a radio-frequency signal beam at different beam pointing angles in accordance with some embodiments.

FIG. 4 is a diagram showing how antennas 30 for handling radio-frequency signals at millimeter and centimeter wave frequencies may be formed in a phased antenna array. As shown in FIG. 4, phased antenna array 36 (sometimes referred to herein as array 36, antenna array 36, or array 36 of antennas 30) may be coupled to radio-frequency transmission line paths 32. For example, a first antenna 30-1 in phased antenna array 36 may be coupled to a first radio-frequency transmission line path 32-1, a second antenna 30-2 in phased antenna array 36 may be coupled to a second radio-frequency transmission line path 32-2, an Mth antenna 30-M in phased antenna array 36 may be coupled to an Mth radio-frequency transmission line path 32-M, etc. While antennas 30 are described herein as forming a phased antenna array, the antennas 30 in phased antenna array 36 may sometimes also be referred to as collectively forming a single phased array antenna (e.g., where each antenna. 30 in the phased array antenna forms an antenna element of the phased array antenna).

Radio-frequency transmission line paths 32 may each be coupled to millimeter/centimeter wave transceiver circuitry 28 of FIG. 3. Each radio-frequency transmission line path 32 may include one or more radio-frequency transmission lines, a positive signal conductor, and a ground signal conductor. The positive signal conductor may be coupled to a positive antenna feed terminal on an antenna resonating element of the corresponding antenna 30, The ground signal conductor may be coupled to a ground antenna feed terminal on an antenna ground for the corresponding antenna 30.

Radio-frequency transmission line paths 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, conductive vias, combinations of these, etc. Multiple types of transmission lines may be used to couple the millimeter/centimeter wave transceiver circuitry to phased antenna array 36. Filter circuitry, switching circuitry, impedance matching circuitry, phase shifter circuitry, amplifier circuitry, and/or other circuitry may be interposed on radio-frequency transmission line path 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Antennas 30 in phased antenna array 36 may be arranged in any desired number of rows and columns or in any other desired pattern (e.g., the antennas need not be arranged in a grid pattern having rows and columns). During signal transmission operations, radio-frequency transmission line paths 32 may be used to supply signals (e.g., radio-frequency signals such as millimeter wave and/or centimeter wave signals) from millimeter/centimeter wave transceiver circuitry 28 (FIG. 3) to phased antenna array 36 for wireless transmission, During signal reception operations, radio-frequency transmission line paths 32 may be used to convey signals received at phased antenna array 36 (e.g., from external wireless equipment 10' of FIG. 3) to millimeter/centimeter wave transceiver circuitry 28 (FIG. 3).

The use of multiple antennas 30 in phased antenna array 36 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 4, the antennas 30 in phased antenna array 36 each have a corresponding radio-frequency phase and magnitude controller 33 (e.g., a first phase and magnitude controller 33-1 interposed on radio-frequency transmission line path 32-1 may control phase and magnitude for radio-frequency signals handled by antenna 30-1, a second phase and magnitude controller 33-2 interposed on radio-frequency transmission line path 32-2 may control phase and magnitude for radio-frequency signals handled by antenna 30-2, an Mth phase and magnitude controller 33-M interposed on radio-frequency transmission line path 32-M may control phase and magnitude for radio-frequency signals handled by antenna 30-M, etc.).

Phase and magnitude controllers 33 may each include circuitry for adjusting the phase of the radio-frequency signals on radio-frequency transmission line paths 32 (e.g., phase shifter circuits) and/or circuitry for adjusting the magnitude of the radio-frequency signals on radio-frequency transmission line paths 32 (e.g., power amplifier and/or low noise amplifier circuits). Phase and magnitude controllers 33 may sometimes be referred to collectively herein as beam steering or beam forming circuitry (e.g., beam steering circuitry that steers the beam of radio-frequency signals transmitted and/or received by phased antenna array 36).

Phase and magnitude controllers 33 may adjust the relative phases and/or magnitudes of the transmitted signals that are provided to each of the antennas in phased antenna array 36 and may adjust the relative phases and/or magnitudes of the received signals that are received by phased antenna array 36. Phase and magnitude controllers 33 may, if desired, include phase detection circuitry for detecting the phases of the received signals that are received by phased antenna array 36. The term "beam," "signal beam," "radio-frequency beam," or "radio-frequency signal beam" may be used herein to collectively refer to wireless signals that are transmitted and received by phased antenna array 36 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 33 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 33 are adjusted to produce a second set of phases and/or magnitudes for the transmitted signals, the transmitted signals will form a transmit beam as shown by beam B2 that is oriented in the direction of point B. Similarly, if phase and magnitude controllers 33 are adjusted to produce the first set of phases and/or magnitudes, radio-frequency signals (e.g., radio-frequency signals in a receive beam) may be received from the direction of point A, as shown by beam B1. If phase and magnitude controllers 33 are adjusted to produce the second set of phases and/or magnitudes, radio-frequency signals may be received from the direction of point B, as shown by beam B2.

Each phase and magnitude controller 33 may be controlled to produce a desired phase and/or magnitude based on a corresponding control signal S received from control circuitry 38 of FIG. 4 over control paths 34 (e.g., the phase and/or magnitude provided by phase and magnitude controller 33-1 may be controlled using control signal S1 on control path 34-1, the phase and/or magnitude provided by phase and magnitude controller 33-2 may be controlled using control signal S2 on control path 34-2, the phase and/or magnitude provided by phase and magnitude controller 33-M may be controlled using control signal SM on control path 34-M, etc.). If desired, control circuitry 38 may actively adjust control signals S in real time to steer the transmit or receive beam in different desired directions (e.g., to different desired beam pointing angles) over time. Phase and magnitude controllers 33 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 36 and external wireless equipment (e.g., external wireless equipment 10' of FIG. 3). If the external wireless equipment is located at point A of FIG. 4, phase and magnitude controllers 33 may be adjusted to steer the signal beam towards point A (e.g., to form a signal beam having a beam pointing angle directed towards point A). Phased antenna array 36 may then transmit and receive radio-frequency signals in the direction of point A. Similarly, if the external wireless equipment is located at point B, phase and magnitude controllers 33 may be adjusted to steer the signal beam towards point B (e.g., to form a signal beam having a beam pointing angle directed towards point B). Phased antenna array 36 may then transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 36 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 38 of FIG. 4 may form a part of control circuitry 14 of FIG. 3 or may be separate from control circuitry 14 of FIG. 3. Control circuitry 38 of FIG. 4 may identify a desired beam pointing angle for the signal beam of phased antenna array 36 and may adjust the control signals S provided to phased antenna array 36 to configure phased antenna array 36 to form (steer) the signal beam at that beam pointing angle. Each possible beam pointing angle that can be used by phased antenna array 36 during wireless communications may be identified by a beam steering codebook such as codebook 40. Codebook 40 may be stored at control circuitry 38, elsewhere on device 10, or may be located (offloaded) on external equipment and conveyed to device 10 over a wired or wireless communications link.

Codebook 40 may identify each possible beam pointing angle that may be used by phased antenna array 36. Control circuitry 38 may store or identify phase and magnitude settings for phase and magnitude controllers 33 to use in implementing each of those beam pointing angles (e.g., control circuitry 38 or codebook 40 may include information that maps each beam pointing angle for phased antenna array 36 to a corresponding set of phase and magnitude values for phase and magnitude controllers 33). Codebook 40 may be hard-coded or soft-coded into control circuitry 38 or elsewhere in device 10, may include one or more databases stored at control circuitry 38 or elsewhere in device 10 (e.g., codebook 40 may be stored as software code), may include one or more look-up-tables at control circuitry 38 or elsewhere in device 10, and/or may include any other desired data structures stored in hardware and/or software on device 10. Codebook 40 may be generated during calibration of device 10 (e.g., during design, manufacturing, and/or testing of device 10 prior to device 10 being received by an end user) and/or may be dynamically updated over time (e.g., after device 10 has been used by an end user).

Control circuitry 38 may generate control signals S based on codebook 40. For example, control circuitry 38 may identify a beam pointing angle that would be needed to communicate with external wireless equipment 10' of FIG. 3 (e.g., a beam pointing angle pointing towards external wireless equipment 10'). Control circuitry 38 may subsequently identify the beam pointing angle in codebook 40 that is closest to this identified beam pointing angle. Control circuitry 38 may use codebook 40 to generate phase and magnitude values for phase and magnitude controllers 33. Control circuitry 38 may transmit control signals S identifying these phase and magnitude values to phase and magnitude controllers 33 over control paths 34. The beam formed by phased antenna array 36 using control signals S will be oriented at the beam pointing angle identified by codebook 40. If desired, control circuitry 38 may sweep over some or all of the different beam pointing angles identified by codebook 40 until the external wireless equipment is found and may use the corresponding beam pointing angle at which the external wireless equipment was found to communicate with the external wireless equipment (e.g., over communications link 31 of FIG. 3).

Figure 5:
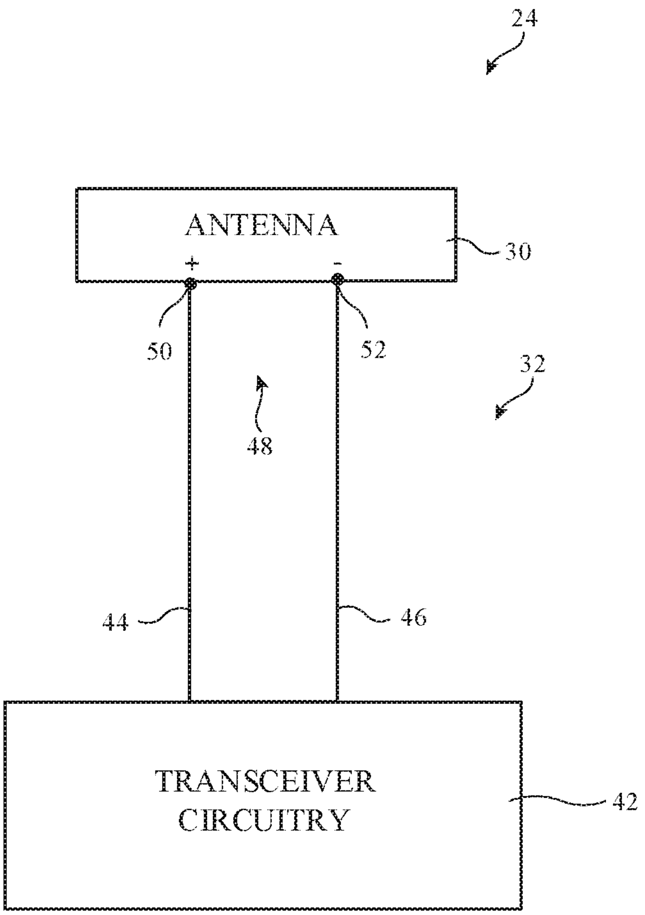
FIG. 5 is a diagram of illustrative wireless circuitry in accordance with some embodiments.

A schematic diagram of an antenna 30 that may be formed in phased antenna array 36 (e.g., as antenna 30-1, 30-2, 30-3, and/or 30-N in phased antenna array 36 of FIG. 4) is shown in FIG. 5. As shown in FIG. 5, antenna 30 may be coupled to transceiver circuitry 42 (e.g., millimeter wave transceiver circuitry 28 of FIG. 3). Transceiver circuitry 42 may be coupled to antenna feed 48 of antenna 30 using radio-frequency transmission line path 32. Antenna feed 48 may include a positive antenna feed terminal such as positive antenna feed terminal 50 and may include a ground antenna feed terminal such as ground antenna feed terminal 52. Radio-frequency transmission line path 32 may include a positive signal conductor such as signal conductor 44 that is coupled to positive antenna feed terminal 50 and a ground conductor such as ground conductor 46 that is coupled to ground antenna feed terminal 52.

Any desired antenna structures may be used for implementing antenna 30. In one suitable arrangement that is sometimes described herein as an example, stacked patch antenna structures may be used for implementing antenna 30. Antennas 30 that are implemented using stacked patch antenna structures may sometimes be referred to herein as stacked patch antennas or simply as patch antennas.

In general, it may be desirable for a given phased antenna array 36 to cover multiple frequency bands such as a first frequency band around 24-30 GHz (e.g., a 5G NR FR2 frequency band) and a second frequency band around 57-61 GHz (e.g., a WiGig frequency band). In order to cover both of these frequency bands, phased antenna array 36 may include a first set of patch antennas that covers the first frequency band and a second set of patch antennas that covers the second frequency band. In some scenarios, the first and second sets of patch antennas are arranged in an interleaved pattern across the phased antenna array (e.g., a pattern in which the phased antenna array alternates between patch antennas in the first and second sets across a given row or column of the array). However, interleaving the first and second sets of patch antennas in this way can cause phased antenna array 36 to occupy an excessive amount of space in device 10. In order to minimize the space consumed by phased antenna array 36 while still supporting satisfactory communication in both the first and second frequency bands, each patch antenna in the first set may be co-located with a respective patch antenna in the second set across phased antenna array 36.

Figure 6:
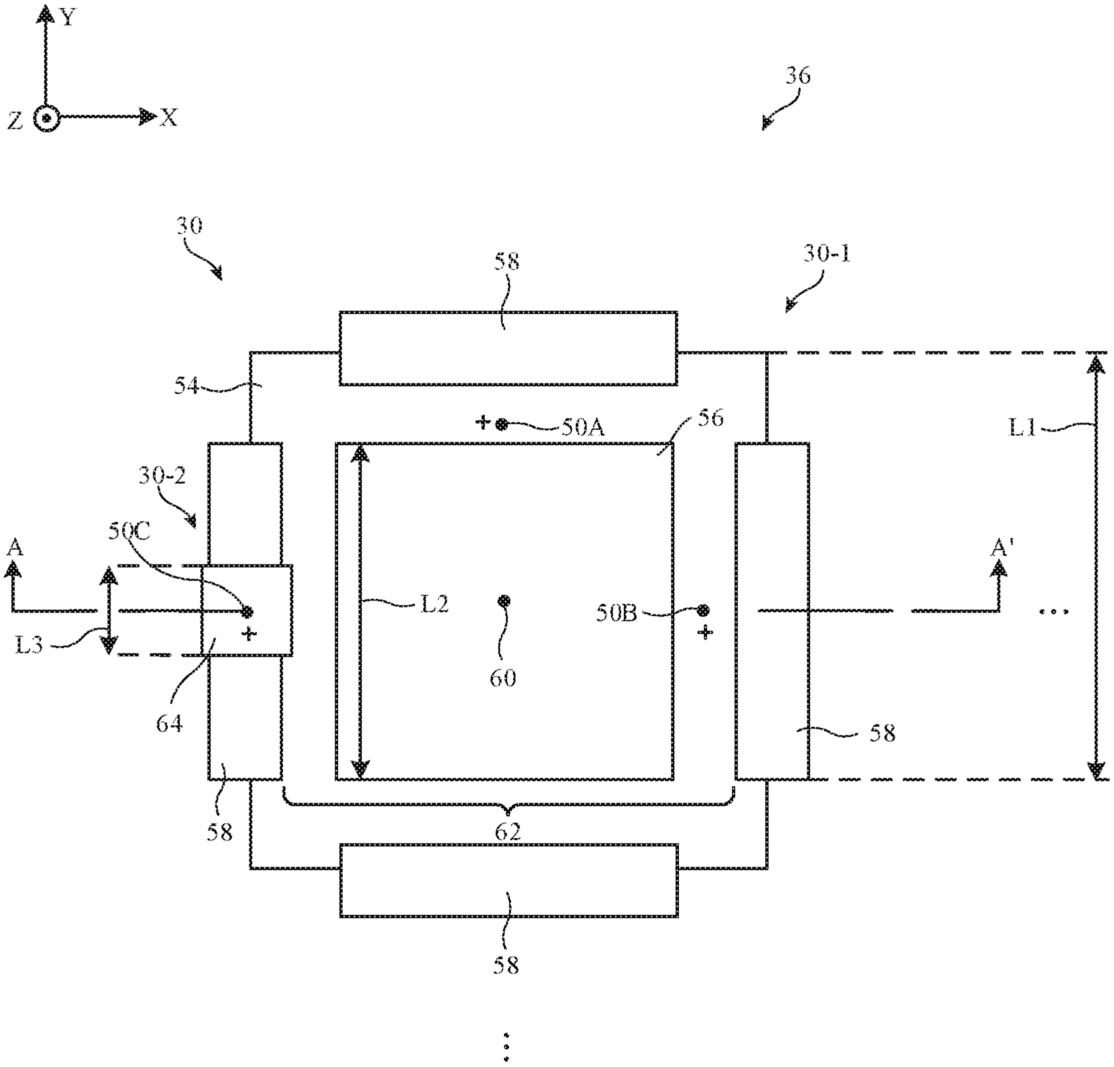
FIG. 6 is a top view of an illustrative co-located antennas in accordance with some embodiments.

FIG. 6 is a top view showing how an illustrative patch antenna from the first set may be co-located with a given patch antenna from the second set. As shown in FIG. 6, phased antenna array 36 may include a first antenna 30-1 from the first set (e.g., a patch antenna for covering the first frequency band around 24-30 GHz) and a second patch antenna 30-2 from the second set (e.g., a patch antenna for covering the second frequency band around 57-61 GHz).

Antenna 30-1 may have an antenna radiating element that includes patch element 54. Patch element 54 (sometimes referred to herein as patch 54, conductive patch 54, patch antenna resonating element 54, patch antenna radiating element 54, radiating element 54, resonating element 54, or antenna resonating element 54) may be formed from conductive traces on an underlying substrate or from any other desired conductive materials. Patch element 54 may be separated from and extend parallel to an underlying antenna ground (not shown in FIG. 6 for the sake of clarity).

The length of the sides of patch element 54 may be selected so that antenna 30-1 resonates (radiates) at desired operating frequencies. In one suitable arrangement that is described herein as an example, patch element 54 is a square patch having four edges of length L1. Length L1 may be selected to be approximately equal to half of the effective wavelength of the signals conveyed by antenna 30-1 (e.g., where the effective wavelength is equal to the free space wavelength multiplied by a constant determined by the dielectric properties of the materials surrounding patch element 54). Length L1 may be selected to configure antenna 30-1 to radiate in the first frequency band (e.g., at frequencies between 24-30 GHz). The example of FIG. 6 merely illustrative. If desired, patch element 54 may have a non-square rectangular shape having two edges of length L1 and having two edges of a different length (e.g., for covering multiple frequency bands). In general, patch element 54 may be formed in any desired shape having any desired number of straight and/or curved edges.

To enhance the polarizations handled by antenna 30-1, antenna 30-1 may be provided with multiple antenna feeds. As shown in FIG. 6, antenna 30-1 may include a first antenna feed having positive antenna feed terminal 50A and may include a second antenna feed having positive antenna feed terminal 50B. Positive antenna feed terminals 50A and 50B may be coupled to transceiver circuitry 42 (FIG. 5) using respective radio-frequency transmission line paths 32, for example. Positive antenna feed terminals 50A and 50B may be coupled to patch element 54 (e.g., at respective locations along orthogonal sides of patch element 54, along orthogonal diagonal axes of patch element 54, etc.).

When using positive antenna feed terminal 50A, antenna 30-1 may transmit and/or receive radio-frequency signals with a first polarization (e.g., a first linear polarization). When using positive antenna feed terminal 50B, antenna 30-1 may transmit and/or receive radio-frequency signals with a second polarization (e.g., a second linear polarization). The second polarization may be orthogonal to the first polarization. This is merely illustrative and, if desired, positive antenna feed terminals 50A and 50B may be used to convey radio-frequency signals with other polarizations (e.g., elliptical polarizations, circular polarizations, etc.). Antenna 30-1 may include only one of positive antenna feed terminals 50A or 50B if desired (e.g., antenna 30-1 need not be a dual-polarization antenna).

In order to increase the bandwidth of antenna 30-1, antenna 30-1 may include one or more parasitic elements layered over (e.g., overlapping) patch element 54. In some scenarios, the parasitic elements are confined to a single co-planar layer over patch element 54. In one suitable arrangement that is described herein as an example, the parasitic patches in antenna 30-1 may be distributed across two or more layers over patch element 54.

For example, as shown in FIG. 6, antenna 30-1 may include a parasitic patch such as parasitic patch 56 (sometimes referred to herein as parasitic resonating element 56, parasitic antenna element 56, parasitic element 56, parasitic conductor 56, parasitic structure 56, or patch 56). Parasitic patch 56 and patch element 54 may be centered about central axis 60. In one suitable arrangement that is described herein as an example, parasitic patch 56 is a square patch having edges (sides) of length L2. Length L2 may be less than the length L1 of the edges of patch element 54. The edges of parasitic patch 56 may be oriented parallel to the edges of patch element 54 (e.g., parasitic patch 56 may be aligned with patch element 54). The example of FIG. 6 merely illustrative. If desired, parasitic patch 56 may have a non-square rectangular shape or any other desired shape having any desired number of straight and/or curved edges.

Antenna 30-1 may also include a set of co-planar parasitic patches 58 (sometimes referred to herein as parasitic resonating elements 58, parasitic antenna elements 58, parasitic elements 58, parasitic conductors 58, parasitic structures 58, or patches 58). Parasitic patches 58 may be located at a different distance from patch element 54 than parasitic patch 56. For example, parasitic patches 58 may be located at a first distance from (over) patch element 54 whereas parasitic patch 56 is located at a second distance that is greater than the first distance from patch element 54. Each parasitic patch 58 may be separated from an opposing parasitic patch 58 by gap 62. Gap 62 may overlap patch element 54 and central axis 60. Parasitic patch 56 may overlap gap 62. In the example of FIG. 6, parasitic patch 56 is non-overlapping with respect to parasitic patches 58. In another suitable arrangement, parasitic patches 58 may partially overlap parasitic patch 56. If desired, each parasitic patch 58 may overlap a respective edge of the underlying patch element 54.

If desired, each parasitic patch 58 may be the same size and shape (e.g., where a first pair of the parasitic patches 58 extend along first parallel longitudinal axes and a second pair of the parasitic patches 58 extend along second parallel longitudinal axes perpendicular to the first parallel longitudinal axes). In one suitable arrangement that is described herein as an example, parasitic patches 58 are rectangular patches having edges (sides) that are shorter than length L1 and that are greater than, equal to, or less than length L2. Each parasitic patch 58 may have edges that are oriented parallel to the edges of patch element 54 and parasitic patch 56.

The example of FIG. 6 merely illustrative. If desired, parasitic patches 58 may have other rectangular shapes or any other desired shapes having any desired number of straight and/or curved edges. Parasitic patches 56 and 58 may sometimes be referred to herein collectively as multi-layer parasitic antenna resonating elements, multi-layer parasitic elements, multi-layer parasitic patches, dual-layer parasitic elements, or multi-layer parasitic structures for antenna 30-1. Parasitic elements 58 and 56 may serve to expand the resonance and thus the bandwidth of antenna 30-1, thereby allowing antenna 30-1 to cover a relatively large range of frequencies such as the entirety of the first frequency band between 24 GHz and 30 GHz. Distributing the parasitic patches of antenna 30-1 across multiple layers may serve to minimize the lateral footprint of antenna 30-1, for example.

As shown in FIG. 6, antenna 30-2 may be co-located with antenna 30-1. Antenna 30-2 may have an antenna radiating element that includes patch element 64. Patch element 64 (sometimes referred to herein as patch 64, conductive patch 64, patch antenna resonating element 64, patch antenna radiating element 64, radiating element 64, resonating element 64, or antenna resonating element 64) may be formed from conductive traces that are coplanar with parasitic patch 56 in antenna 30-1 (e.g., patch element 64 and parasitic patch 56 may be formed from conductive traces on the same layer of dielectric substrate). Patch element 64 may at least partially overlap one of the underlying parasitic elements 58 in antenna 30-1.

The length of the sides of patch element 64 may be selected to configure antenna 30-2 to resonate (radiate) at desired operating frequencies. In one suitable arrangement that is described herein as an example, patch element 64 is a square patch having four edges of length L3. Length L3 may be selected to be approximately equal to half of the effective wavelength of the signals conveyed by antenna 30-2. Length L3 may, for example, be selected to configure antenna 30-2 to radiate in the second frequency band (e.g., a WiGig frequency band or another frequency band at frequencies between 57-61 GHz).

If desired, length L3 may be approximately equal to (e.g., within 25% of) the width of the underlying parasitic element 58 in antenna 30-1 (e.g., as measured parallel to the X-axis of FIG. 6). The edges of patch element 64 may extend parallel to each of the edges of patch element 54 and parasitic patches 58 and 56 in antenna 30-1. Patch element 64 may be aligned with an axis extending parallel to the X-axis of FIG. 6 and through central axis 60. The example of FIG. 6 merely illustrative. If desired, patch element 64 may have a non-square rectangular shape having two edges of length L3 and having two edges of a different length (e.g., for covering multiple frequency bands). Patch element 64 may need not overlap the center of the underlying parasitic element 58 and may, if desired, overlap other portions of the underlying parasitic element 58. In general, patch element 64 may be formed in any desired shape having any desired number of straight and/or curved edges.

Antenna 30-2 may have a corresponding antenna feed with a positive antenna feed terminal 50C coupled to patch element 64 (e.g., along one of the edges of patch element 64, along a diagonal axis of patch element 64, etc.). In other words, patch element 64 may be directly fed. While antenna 30-2 is shown as a single-polarization antenna in the example of FIG. 6, antenna 30-2 may be a dual-polarization having a pair of orthogonal positive antenna feed terminals if desired (e.g., positive antenna feed terminals coupled to patch element 64 along orthogonal edges of patch element 64, along diagonal axes of patch element 64, etc.). In another suitable arrangement, antenna 30-2 may include an additional patch element 64 overlapping one of the parasitic patches 58 extending parallel to the X-axis of FIG. 6. The additional patch element 64 may be fed by a corresponding positive antenna feed terminal and may radiate with a polarization orthogonal to the polarization covered by positive antenna feed terminal 50C and the patch element 64 shown in FIG. 6.

Forming patch element 64 from the top-most layer of conductive traces in both antennas 30-1 and 30-2 may allow antenna 30-2 to radiate in the second frequency band without being blocked by conductive structures in antenna 30-1. At the same time, because antenna 30-2 covers higher frequencies than antenna 30-1, antenna 30-2 may be located over patch element 54 and parasitic elements 58 without significantly blocking radiation by antenna 30-1 in the first frequency band. Co-locating antennas 30-1 and 30-2 in this way may allow antennas 30-1 and 30-2 to collectively exhibit a lateral footprint that is approximately equal to the lateral footprint of only antenna 30-1. Each of the antennas 30-1 in phased antenna array 36 may be co-located with a respective antenna 30-2 in this way. This may serve to minimize the overall space consumed by phased antenna array 36 while also allowing phased antenna array 36 to cover both the first and second frequency bands.

Figure 7:
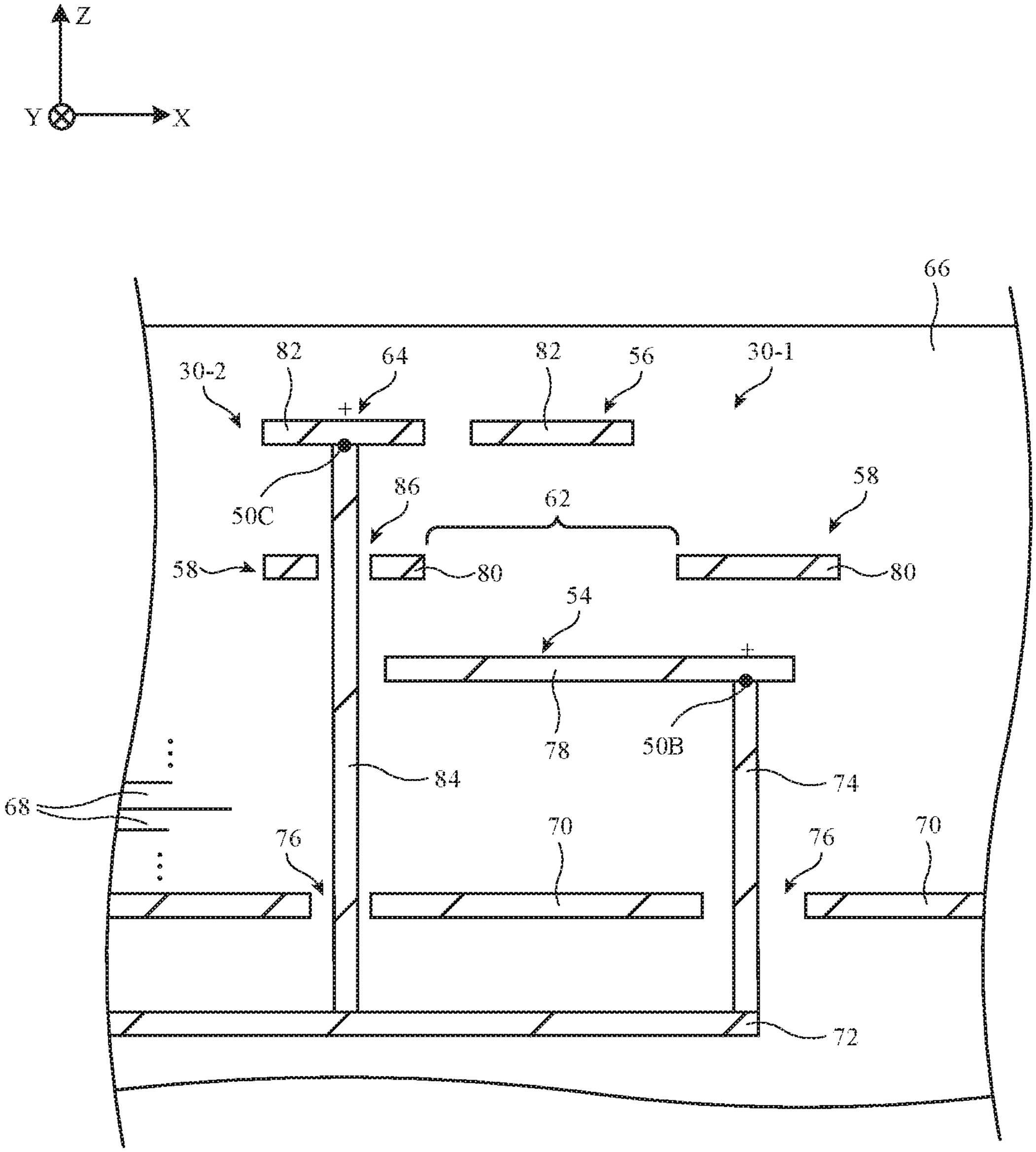
FIG. 7 is a cross-sectional side view of illustrative co-located antennas in accordance with some embodiments.

FIG. 7 is a cross-sectional side view of co-located antennas 30-1 and 30-2 (e.g., as taken in the direction of line AA' of FIG. 6). As shown in FIG. 7, antennas 30-1 and 30-2 may be formed on a dielectric substrate such as substrate 66. If desired, each of the antennas in the phased antenna array may be formed on the same dielectric substrate (e.g., in an integrated antenna module having a radio-frequency integrated circuit mounted to substrate 66). Substrate 66 may be, for example, a rigid or printed circuit board or another dielectric substrate. Substrate 66 may include multiple stacked dielectric layers 68 (e.g., layers of printed circuit board substrate, layers of fiberglass-filled epoxy, layers of polyimide, layers of ceramic substrate, or layers of other dielectric materials).

With this type of arrangement, antennas 30-1 and 30-2 may be embedded within the layers of substrate 66. For example, patch element 54 in antenna 30-1 may be formed from conductive traces 78 (e.g., a first layer of conductive traces patterned on a first layer 68 of substrate 66). Each of the parasitic patches 58 in antenna 30-1 may be formed from conductive traces 80 (e.g., a second layer of conductive traces patterned on a second layer 68 of substrate 66). The second layer 68 of substrate 66 may be layered over the first layer 68 of substrate 66. Parasitic patch 56 of antenna 30-1 and patch element 64 of antenna 30-2 may be formed from conductive traces 82 (e.g., a third layer of conductive traces patterned on a third layer 68 of substrate 66). The third layer 68 of substrate 66 may be layered over the second layer 68 of substrate 66 (e.g., the second layer may be vertically interposed between the first and third layers of substrate 66). One or more additional layers 68 may be vertically interposed between the first and second layers 68 and/or between the second and third layers of dielectric substrate 66 if desired. Forming parasitic patch 56 and patch element 64 from the same layer of (coplanar) conductive traces may serve to minimize the thickness of substrate 66 (e.g., parallel to the Z axis of FIG. 7).

Antennas 30-1 and 30-2 may share a common an antenna ground that includes ground traces 70 (e.g., a ground plane for antennas 30-1 and 30-2). The same ground traces 70 may be used to form the antenna ground for each antenna in the phased antenna array if desired. Patch element 54, parasitic elements 58, parasitic patch 56, and patch element 64 may each be separated from and may extend parallel to ground traces 70. One or more layers 68 of substrate 66 may be vertically interposed between ground traces 70 and patch element 54. Zero, one, or more than one layer 68 in substrate 66 may be vertically interposed between conductive traces 82 and the exterior of substrate 66.

Ground traces 70 may have openings such as openings 76. Signal traces 72 may be patterned on one or more of the layers 68 in substrate 66 (e.g., ground traces 70 may be vertically interposed between signal traces 72 and patch element 54). Signal traces 72 may, for example, form the signal conductors of the radio-frequency transmission line paths for antennas 30-1 and 30-2. A conductive via such as conductive via 74 may couple signal traces 72 to positive antenna feed terminal 50B on patch element 54 (e.g., through a corresponding opening 76 in ground traces 70). Similar feeding structures may be used to feed positive antenna feed terminal 50A (FIG. 6).

The parasitic patches 58 formed from conductive traces 80 may be separated by gap 62. Gap 62 may overlap patch element 54. Parasitic patches 58 may each at least partially overlap patch element 54. Parasitic patch 56 may overlap gap 62 and patch element 54. Patch element 54 may be directly fed (e.g., by positive antenna feed terminal 509) whereas parasitic patches 56 and 58 are not directly fed (e.g., each of the parasitic patches is floating). First capacitances may be established between parasitic patch 56 and each of the parasitic patches 58. Second capacitances may be established between each of the parasitic patches 58 and patch element 54. These capacitances may serve to increase the total capacitance between patch element 54 and the uppermost parasitic patch relative to arrangements where antenna 30-1 includes single-layer parasitic structures, which may allow antenna 30-1 to exhibit an even more compact volume relative to arrangements where antenna 30-1 includes single-layer parasitic structures, for example.

An additional conductive via such as conductive via 84 may couple signal traces 72 to patch element 64 (e.g., at positive antenna feed terminal 50C). Conductive via 84 may extend through a corresponding opening 76 in ground traces 70. The parasitic patch 58 underlying patch element 64 may also include a hole or opening 86. Conductive via 84 may extend through opening 86 to couple signal traces 72 to positive antenna feed terminal 50C. The parasitic element 58 underlying patch element 64 may perform impedance matching for antenna 30-2 in the second frequency band (e.g., by establishing an additional capacitance between signal traces 72 and patch element 64). At the same time, the parasitic patch 58 underlying patch element 64 may help to broaden the bandwidth of antenna 30-1 in the first frequency band. This may, for example, allow the dimensions of patch element 64 (e.g., length L3 of FIG. 6) to be even smaller than would otherwise be possible in the absence of the underlying parasitic patch 58 (e.g., length L3 may be less than one-half a wavelength corresponding to a frequency in the second frequency band). In this way, antennas 30-1 and 30-2 may be co-located on substrate 66, thereby minimizing the lateral footprint and area consumed by the phased antenna array, while still exhibiting satisfactory radio-frequency performance in both the first and second frequency bands.

Figure 8:
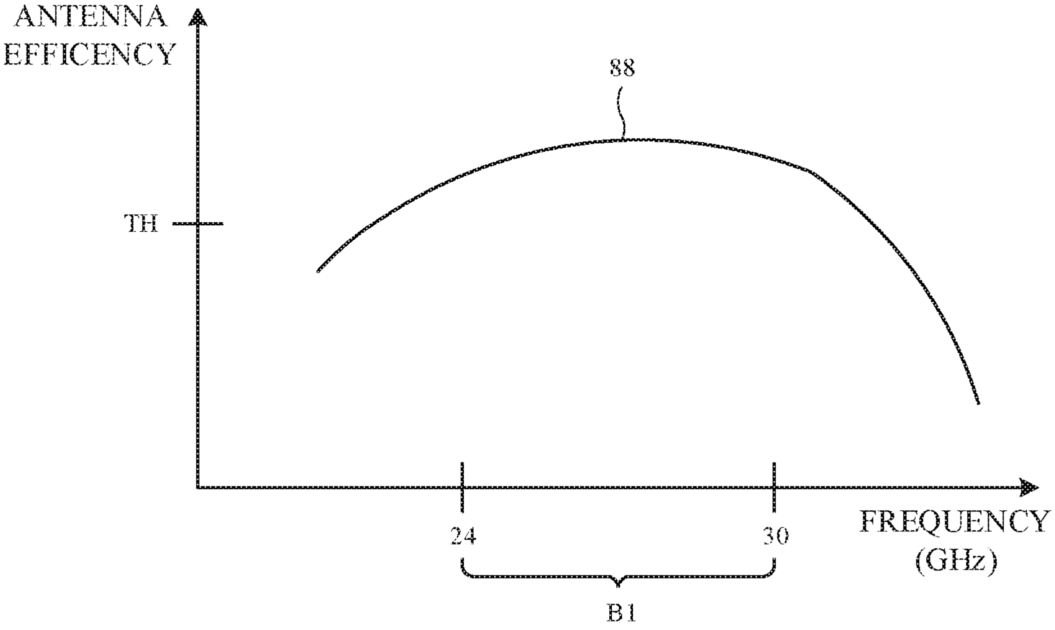
FIGS. 8 and 9 are plots of antenna performance (antenna efficiency) as a function of frequency for illustrative co-located antennas in accordance with some embodiments.

Curve 88 of FIG. 8 is a plot of antenna performance (antenna efficiency) as a function of frequency for antenna 30-1 of FIGS. 6 and 7. As shown by curve 88, antenna 30-1 may, exhibit satisfactory antenna efficiency (e.g., an antenna efficiency greater than threshold level TH) across first frequency band B1. First frequency band B1 may be a 5G NR FR2 frequency band or another frequency band at frequencies between about 24 GHz and 30 GHz, as an example. Parasitic patches 58 and 56 (FIGS. 6 and 7) may configure antenna 30-1 to exhibit satisfactory antenna efficiency across the entirety of first frequency band B1 (e.g., with greater bandwidth than would be obtained in the absence of the parasitic patches).

Figure 9:
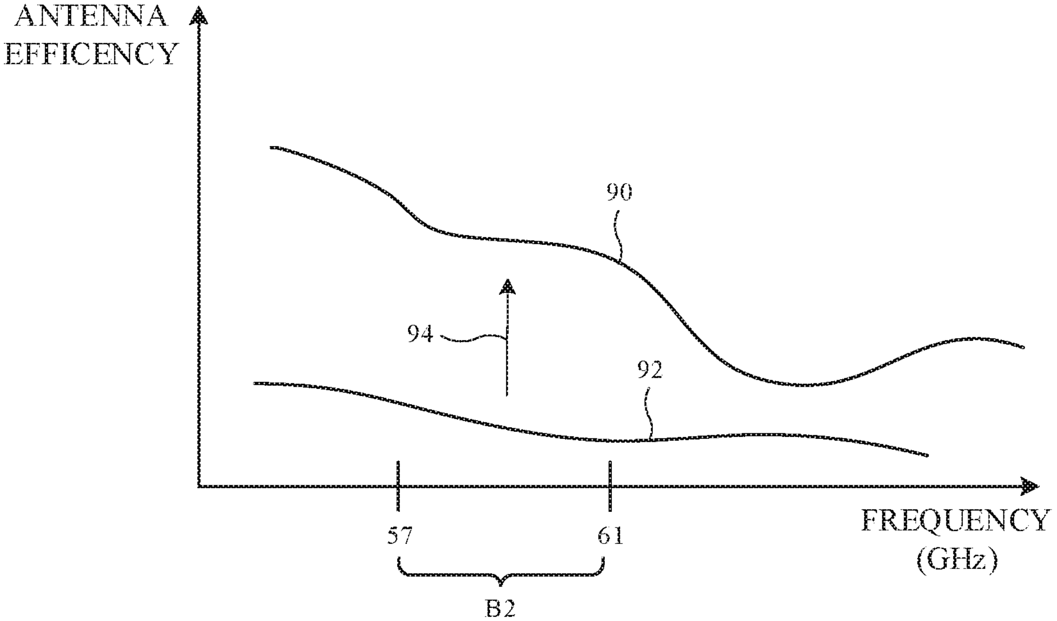

FIG. 9 is a plot of antenna efficiency as a function of frequency for antenna 30-2 of FIGS. 6 and 7. As shown in FIG. 9, curve 92 plots the antenna efficiency of antenna 30-2 in the absence of the underlying parasitic patch 58 from antenna 30-1. Curve 90 of FIG. 9 plots the antenna efficiency of antenna 30-1 in the presence of the underlying parasitic patch 58 from antenna 30-1. The underlying parasitic patch 58 may perform impedance matching for antenna 30-2 that serves to maximize the antenna efficiency of antenna 30-2 in second frequency band B2, as shown by arrow 94. Antenna 30-2 may exhibit satisfactory antenna efficiency across the entirety of second frequency band B2. Second frequency band B2 may be a WiGig frequency band or another frequency band at frequencies between about 57 GHz and 60 GHz, as an example.

The example of FIGS. 8 and 9 is merely illustrative. In practice, curves 88, 92, and 90 may have other shapes. Frequency bands B1 and B2 may cover any desired frequencies (e.g., where frequency hands B1 and B2 are both greater than 10 GHz and frequency band B2 is greater than frequency band B1 by at least 10 GHz). In some suitable arrangements, antennas 30-1 and 30-2 may both be used to perform bi-directional communications with external equipment (e.g., external equipment 10' of FIG. 3). In other suitable arrangements, antenna 30-1 may be perform bi-directional communications with external equipment whereas antenna. 30-2 is used to perform spatial ranging operations for device 10.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a dielectric substrate having first, second, and third layers, the second layer being interposed between the first and third layers;
a first patch element on the first layer, the first patch element being configured to radiate at a first frequency greater than 10 GHz;
a first positive antenna feed terminal coupled to the first patch element;
first and second parasitic patches on the second layer, the first and second parasitic patches at least partially overlapping the first patch element and being separated by a gap that overlaps the first patch element, wherein the first and second parasitic patches are each electrically floating;
a third parasitic patch on the third layer, the third parasitic patch overlapping the gap and the first patch element;
fourth and fifth parasitic patches on the second layer, the fourth parasitic patch being separated from the fifth parasitic patch by the gap;
a second patch element on the third layer, the second patch element at least partially overlapping the first parasitic patch and being configured to radiate at a second frequency greater than the first frequency; and
a second positive antenna feed terminal coupled to the second patch element.

2. The electronic device of claim 1, further comprising:
signal traces on the dielectric substrate;
a first conductive via that couples the signal traces to the first positive antenna feed terminal; and
a second conductive via that couples the signal traces to the second positive antenna feed terminal.

3. The electronic device of claim 2, further comprising:
an opening in the first parasitic patch, wherein the second conductive via extends through the opening.

4. The electronic device of claim 1, wherein the second frequency is in a WiGig frequency band.

5. The electronic device of claim 1, further comprising:
a third positive antenna feed terminal on the first patch element.

6. The electronic device of claim 1, wherein the first frequency is between 24 GHz and 30 GHz and the second frequency is between 57 GHz and 61 GHz.

7. The electronic device of claim 1, wherein the third parasitic patch overlaps only a portion of the gap.

8. The electronic device of claim 1, further comprising:
control circuitry configured to perform bidirectional communications using the first patch element and configured to perform spatial ranging operations using the second patch element.

9. The electronic device of claim 1, further comprising:
control circuitry configured to perform bidirectional communications using the first and second patch elements.

10. The electronic device of claim 1, wherein the first parasitic patch is configured to perform impedance matching in a frequency band that includes the second frequency for the second patch element.

11. An electronic device comprising:
a first patch antenna having a first patch element and multi-layer parasitic structures that at least partially overlap the first patch element, the first patch antenna being configured to radiate at a first frequency greater than 10 GHz; and
a second patch antenna having a second patch element that is co-planar with a first parasitic patch in the multi-layer parasitic structures and that at least partially overlaps a second parasitic patch in the multi-layer parasitic structures, the second patch antenna being configured to radiate at a second frequency greater than the first frequency, wherein the second parasitic patch is electrically floating.

12. The electronic device of claim 11, wherein the second parasitic patch has an opening and the second patch antenna is fed by a conductive via that extends through the opening.

13. The electronic device of claim 11, wherein the first parasitic patch is configured to broaden a bandwidth of the first patch antenna in a first frequency band that includes the first frequency and is configured to perform impedance matching for the second patch antenna in a second frequency band that includes the second frequency.

14. The electronic device of claim 11, wherein the first frequency is between 24 GHz and 30 GHz and the second frequency is between 57 GHz and 61 GHz.

15. The electronic device of claim 11, wherein the multi-layer parasitic structures comprise a third parasitic patch that is coplanar with the second parasitic patch and that is separated from the second parasitic patch by a gap, a fourth parasitic patch that is coplanar with the second parasitic patch, and a fifth parasitic patch that is coplanar with the second parasitic patch, the fourth parasitic patch is separated from the fifth parasitic patch by the gap, the first parasitic patch overlaps the gap, and each of the third, fourth, and fifth parasitic patches is electrically floating.

16. The electronic device of claim 15, further comprising:
a first positive antenna feed terminal coupled to the first patch element; and
a second positive antenna feed terminal coupled to the second patch element.

17. The electronic device of claim 15, further comprising:
first and second positive antenna feed terminals coupled to the first patch element; and
a third positive antenna feed terminal coupled to the second patch element.

18. Apparatus comprising:
a dielectric substrate;
a first directly-fed patch element on the dielectric substrate and configured to radiate in a Fifth Generation (5G) New Radio (NR) Frequency Range 2 (FR2) frequency band;
a first parasitic element on the dielectric substrate and overlapping the first directly-fed patch element;
a second directly-fed patch element on the dielectric substrate and at least partially overlapping the first parasitic element, the second directly-fed patch element being configured to radiate in a WiGig frequency band; and
a second parasitic element on the dielectric substrate and at least partially overlapping the first directly-fed patch element, the second parasitic element being coplanar with the second directly-fed patch element.

19. The apparatus of claim 18, wherein the first and second parasitic elements are non-overlapping.

20. The apparatus of claim 19, further comprising:
a third parasitic element on the dielectric substrate and at least partially overlapping the first directly-fed patch element, wherein the third parasitic element is coplanar with the first parasitic element, the third parasitic element is separated from the first parasitic element by a gap, the second parasitic element overlaps the gap, and the second and third parasitic elements are non-overlapping.

* * * * *